(12) United States Patent
Thorman et al.

(10) Patent No.: US 6,910,320 B1
(45) Date of Patent: Jun. 28, 2005

(54) CLEANING DEVICE FOR A MOWER CUTTING CHAMBER

(75) Inventors: Christopher Scott Thorman, Beaver Dam, WI (US); Ronald Paul Holland, Fox Lake, WI (US)

(73) Assignee: Deere & Company, Moline, IL (US)

( * ) Notice: Subject to any disclaimer, the term of this patent is extended or adjusted under 35 U.S.C. 154(b) by 462 days.

(21) Appl. No.: 09/597,069

(22) Filed: Jun. 20, 2000

(51) Int. Cl.⁷ .............................................. A01D 19/00
(52) U.S. Cl. ...................................................... 56/16.8
(58) Field of Search .............................. 56/16.8, 16.7, 56/1, 295, 255

(56) References Cited

U.S. PATENT DOCUMENTS

| | | | |
|---|---|---|---|
| 2,936,563 A | 5/1960 | Blume | 56/25.4 |
| 2,973,615 A * | 3/1961 | Yaremchuk et al. | 56/16.8 |
| 2,984,061 A | 5/1961 | Stabnau | 56/25.4 |
| 2,992,524 A | 7/1961 | Stabnau | 56/25.4 |
| 3,040,990 A | 6/1962 | Gotti | 239/273 |
| 3,045,267 A | 7/1962 | Wagner | 15/50 |
| 3,214,893 A | 11/1965 | Griffin | 56/25.4 |
| 3,332,221 A * | 7/1967 | McCain | 56/295 |
| 3,490,212 A * | 1/1970 | Hengesbach | 56/16.8 |
| 3,535,862 A | 10/1970 | Wittwer | 56/25.4 |
| 3,648,446 A | 3/1972 | Haapoja et al. | 56/320.2 |
| 3,722,820 A * | 3/1973 | Klint, Jr. | 239/129 |
| 3,857,515 A * | 12/1974 | Zennie | 239/169 |
| 5,027,590 A | 7/1991 | Stark | 56/12.1 |
| 5,094,066 A | 3/1992 | McBride et al. | 56/295 |
| 5,237,803 A * | 8/1993 | Domingue, Jr. | 56/16.8 |
| D341,451 S * | 11/1993 | Wheeler | D32/25 |
| 5,444,967 A | 8/1995 | Meuth | 56/12.1 |
| 5,499,492 A * | 3/1996 | Jameson | 56/12.1 |

(Continued)

FOREIGN PATENT DOCUMENTS

CA 625488 8/1961 ..................... 56 53

OTHER PUBLICATIONS

John Deere, Tondeuses Automotrices EuroPro, of pp. 1-4, see all, date of publication Mar. 1997, published in Germany.

(Continued)

*Primary Examiner*—Robert E. Pezzuto
*Assistant Examiner*—Alicia Torres

(57) ABSTRACT

A washing device is provided for removing debris from an underside of a mower having a multi-chamber cutting deck. The device includes a mounting apparatus allowing the device to be attached to a flange of the deck. Connected to the mounting apparatus is an assembly for dispersing liquid such as water and delivering the water to all portions of the underside of the deck. To accomplish this delivery, the assembly includes first and second liquid dispersion plates attached with each other and also connecting with the mounting apparatus to allow the delivery of water therethrough. Provided in one of the plates is a channel having divided end portions which elevate water upon contact so as to lift the water over an included cutting blade. Coupled with this plate is yet another plate enabling connection of the dispersion assembly to the deck and also providing a vent between the two plates. Creation of this vent then allows an emission of water reaching across the width of each of the included chambers. Interaction between an elevated distribution of water reaching across the width of the deck together with simultaneous engagement of the blades results in a swirling effect permitting water to reach the entirety of the deck underside.

30 Claims, 7 Drawing Sheets

U.S. PATENT DOCUMENTS

| | | | |
|---|---|---|---|
| 5,609,011 A | 3/1997 | Kuhn et al. | 56/17.5 |
| 5,782,415 A | 7/1998 | Kepiro | 239/754 |
| 6,145,288 A * | 11/2000 | Tamian et al. | 56/16.8 |
| 6,164,049 A * | 12/2000 | Burch | 56/16.8 |
| 6,260,340 B1 * | 7/2001 | Sanner | 56/16.8 |
| 6,497,088 B1 * | 12/2002 | Holley | 56/16.8 |

OTHER PUBLICATIONS

Castelgarden, tcj 92, see p. 1 of 1, date of publication unknown, published in Europe.

John Deere, LTR Lawn Tractors, of pp. 1-2, see all, date of publication Nov. 1999, published in U.S.A.

* cited by examiner

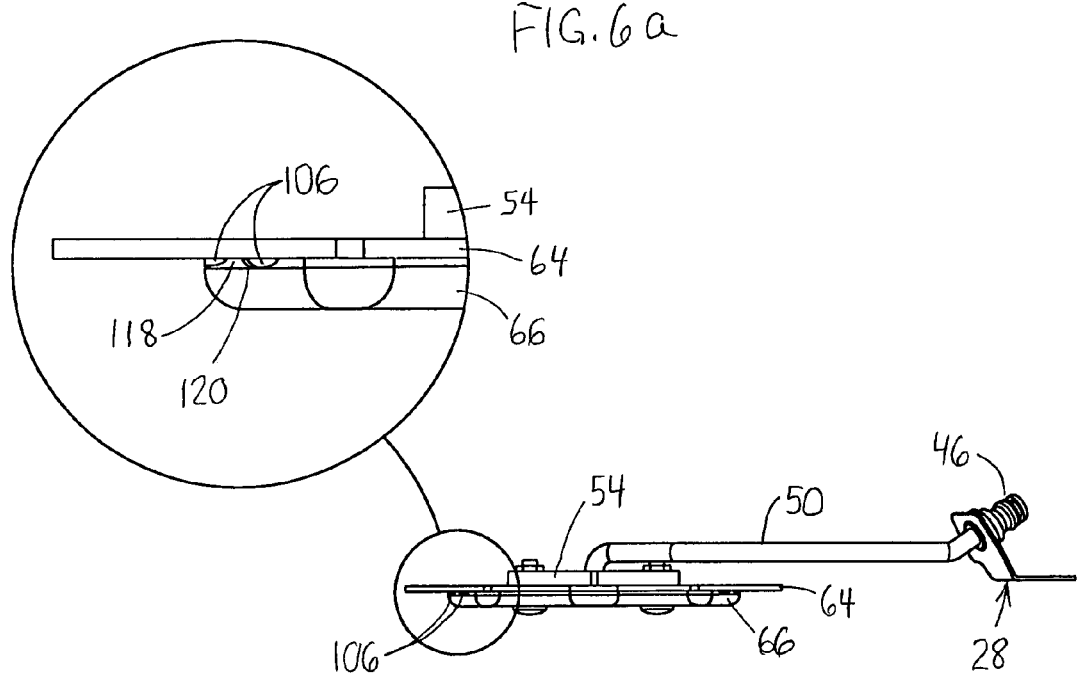
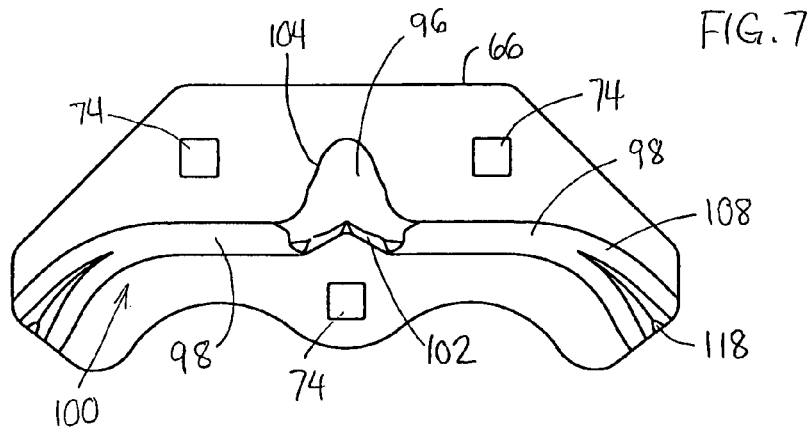

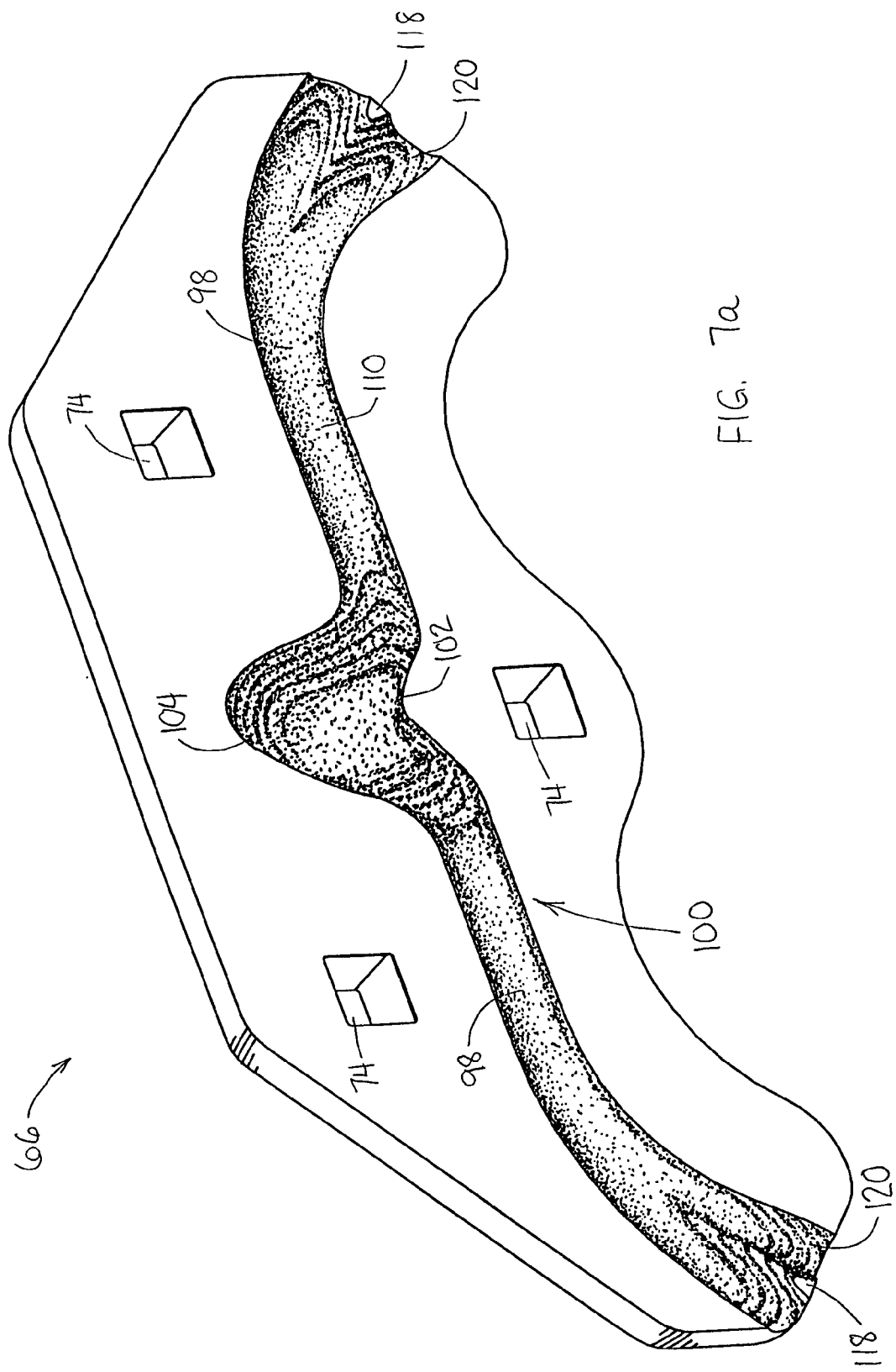

CLEANING DEVICE FOR A MOWER CUTTING CHAMBER

BACKGROUND OF THE INVENTION

1. Field of the Invention

The current invention relates to mower cutting decks having one or more cutting chambers, and more specifically, to an apparatus for removing debris from an underside of the chamber or chambers.

2. Description of Related Art

Mower decks having one or more cutting chambers surrounding a rotatable cutting blade are typically used to provide grounds care by both individuals and professional servicers. Such care ordinarily includes the cutting of lawns in a variety of conditions and often in situations where the grass is wet. The cutting of wet grass gives rise to the problem of the clippings sticking to the underside of the cutting chamber as well as the downwardly extending walls which enclose the chamber. The accumulation of this moistened grass tends to create several notable problems. First, the clippings sometimes fall from the chamber in clumps on the newly cut lawn, thereby deteriorating its appearance. Second, in mowers having discharge chutes, clogging of the chutes hampering delivery of clippings to a collection bag is often a problem requiring disassembly of various parts to remove the collected debris. Third, grass accumulated on the inside of the chamber interferes with the flow of clippings capable of leaving the chamber tending to disrupt the mower's even cutting pattern. Fourth, buildup of wet clippings presents a potential for deterioration of metal chambers due to rust. Fifth, clippings which adhere to an inside of the chamber are sometimes the source of an unpleasant odor disrupting the usual storage place of the mower.

In an attempt to address the removal of the accumulated debris referenced above, the prior art has offered a common solution to clean the underside surfaces of a cutting chamber. The solution involves injecting a cleaning agent, such as water, into the chamber while the blades are or are not engaged. To do this, what has been suggested is an apparatus including a port to which a spray nozzle, of varying design (s), is attached. When the port is positioned on an outside surface of the chamber, the nozzle is inserted through a single opening placed on the top surface or in a side surface of the cutting chamber. After being positioned through the opening, the nozzle is mounted above the cutting blade. Water is then supplied to the chamber by an ordinary garden hose connected to the port and thus, the nozzle. Dependent upon the particular design of the nozzle and upon engagement or non-engagement of the mower blade, water is introduced into the cutting chamber. Distribution of the water can then be assisted by rotation of the blades, if desired to create a scouring effect and thereby clean the underside surfaces.

This solution, however, requires the use of multiple hoses and/or connections when a user desires to wash the underside surfaces of more than one chamber simultaneously. Utilizing such a system of multiple connections may lower water pressure capable of being delivered to the chambers and thereby, result in ineffective washing of the chamber. With this solution, the user is required to connect the hose to each port separately in order to enable the cleaning of the multi-chamber cutting deck. Accordingly, providing a design intended to clean only a single chamber can result in an unwanted expenditure of time, effort, and money since it will be necessary to undertake the cleaning of each chamber separately.

Thus, there exists a need to provide a means to clean a multi-chamber cutting deck simultaneously, effectively and which can easily be made integral with the deck.

SUMMARY OF THE INVENTION

To enable a user to simultaneously wash more than one cutting chamber at a time, there is provided a multi-port washing device. The structure of this device is designed with liquid dispersing vents which deliver a cleansing agent, such as water, across the width of each cutting chamber and above the blade disposed therein. As the water is dispersed into the chamber, an engaged cutting blade circulates the water within the chamber thereby creating a centrifugal effect permitting a scouring of the underside surface of the chamber or chambers.

Mounted to the cutting chamber is an angled bracket having a fitting to which a water supply, such as an ordinary garden hose, is to be attached. Connected to the fitting and the bracket is a tube positioned substantially flush with an outside side surface of the chamber. At another end of the tube there is secured a mounting plate which couples the tube with a liquid dispersion assembly provided adjacent a lower edge of a front flange of the chambers to deliver water to the underside surfaces of the cutting chamber or chambers.

This dispersion assembly is constructed to direct streams of water past both sides of the blade spindle and also, above the blade. The structure of the assembly consists of two plates secured to one another. One of the plates is flat while the other has a channel disposed therein. As water enters into the assembly from the tube, it is directed by the channel to end portions having points where the channel, itself, elevates in height. As water moves along these elevated surfaces, it enters a vent created by the compression of the flat plate against the channel. Thereafter, while passing through the vent and upon exit therefrom, the water is forced against a bottom surface of the flat plate. Contact with the flat plate causes the water to spread into a fanned stream of water emitted from the vent. The stream is further separated due to a division formed on the surface of the channel and located at each of the end portions. This separation permits the water to be split into two distinct flows which are directed toward either side of a spindle to which the blade is attached. Pressured at an ordinary rate such as that used in a home or garden environment, the stream reaches across the width of the cutting chamber thereby contacting a side surface of the chamber opposite that at which it had entered. After flowing across the chamber, water discharged by the assembly and which contacts the opposite side is then deflected downwardly to be impacted by the cutting blade. Upon contact with the blade and the airflow generated by the blade, the supply of water is distributed throughout the inside of the chamber and onto its underside surfaces.

It is contemplated that the above washing device will be constructed as a feature available with cutting decks placed on the retail market. With this construction, each of the angled bracket, tube, and attached mounting plate will be welded together as a one-piece construction. However, it has been recognized that a user may desire to purchase the washing device on an after-market basis with the intention of retrofitting the device to an already purchased deck. In an effort to satisfy this need, the washer has been alternatively designed with flexible tubing which is adjustably secured to the bracket and plate. Providing this option enables versatility in the placement of the washer relative to the outside surface of the deck, an aspect important to those users who may have decks with structure which would otherwise not permit mounting of a design having a fixed overall dimension. Accordingly, with either form of the washing device, a user is permitted to simultaneously wash the underside surface of a cutting deck having one or more cutting chambers.

BRIEF DESCRIPTION OF THE DRAWINGS

FIG. 6 is a view of the dispersion assembly similar to that shown in FIG. 3.

FIG. 6a is an enlarged partial view of the dispersion assembly illustrating the orifices of the dispersion assembly of FIG. 6.

FIG. 7 is a plan view of a second plate of the dispersion assembly as shown in FIG. 3.

FIG. 7a is a front and side elevation view of the second plate as shown in FIG. 7.

DESCRIPTION OF THE PREFERRED EMBODIMENT

Figure 1:
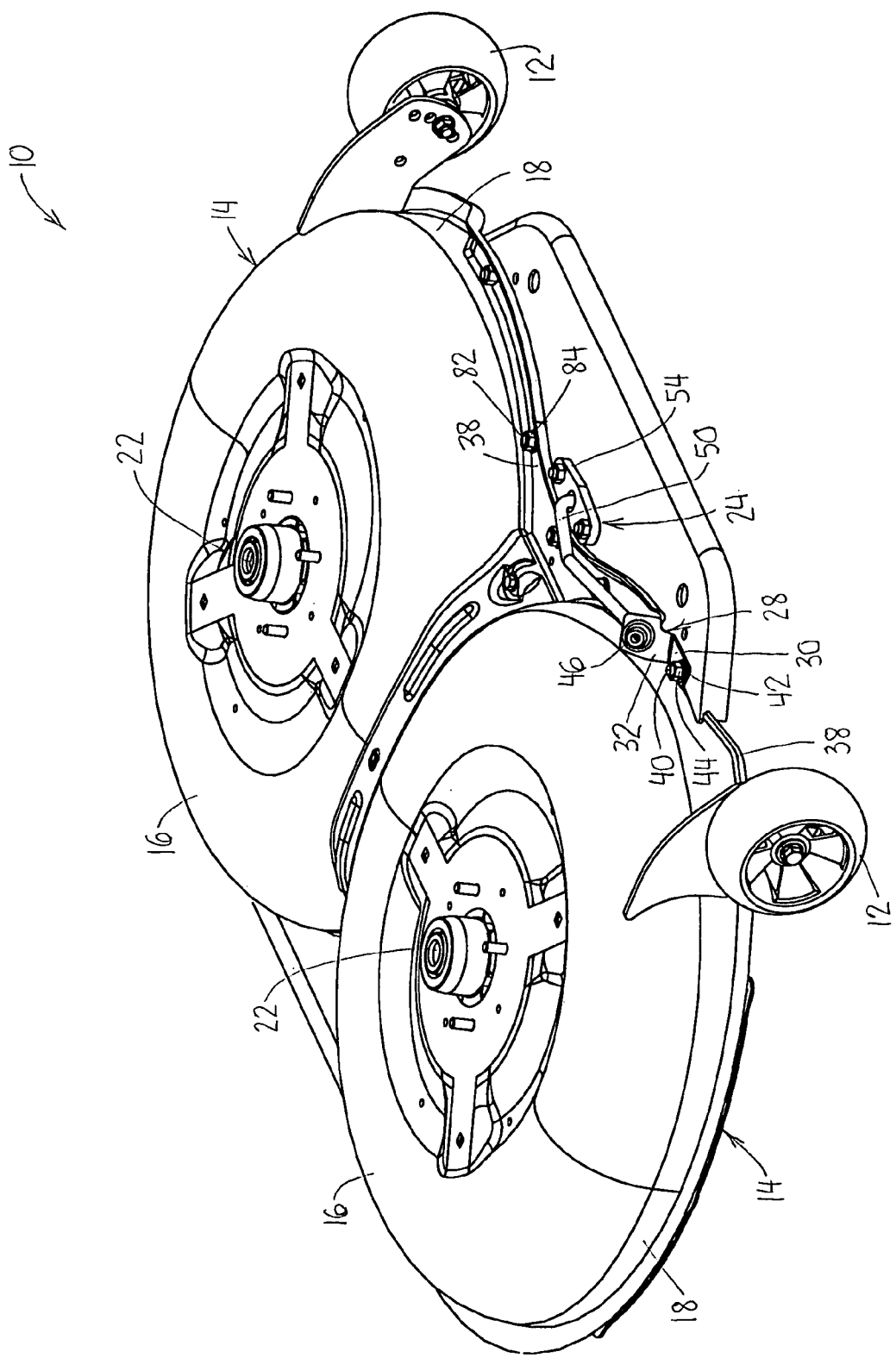
FIG. 1 is a front and side elevation view of a mower cutting deck.
Figure 2:
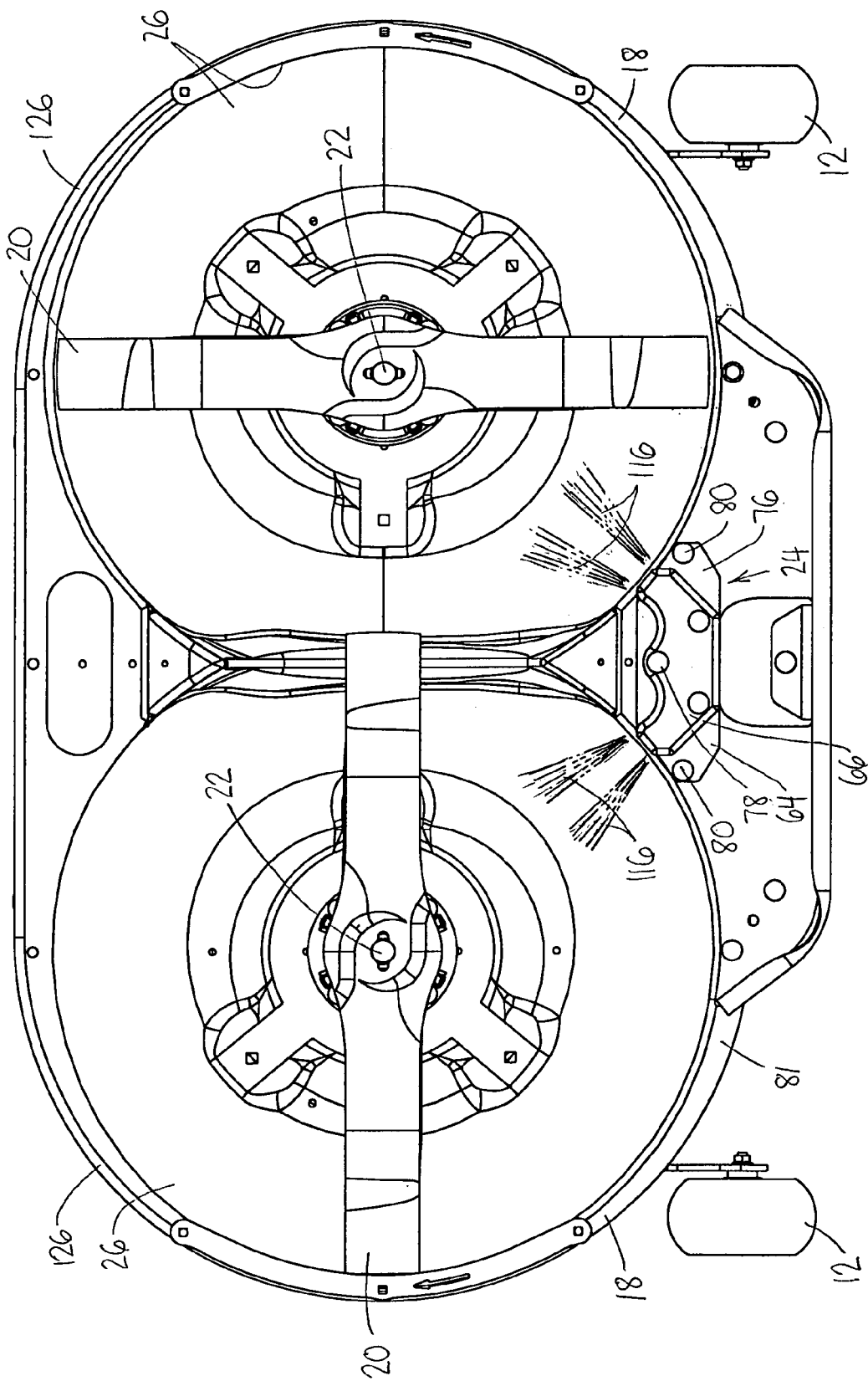
FIG. 2 is a bottom plan view of a mower cutting deck.
Figure 3:
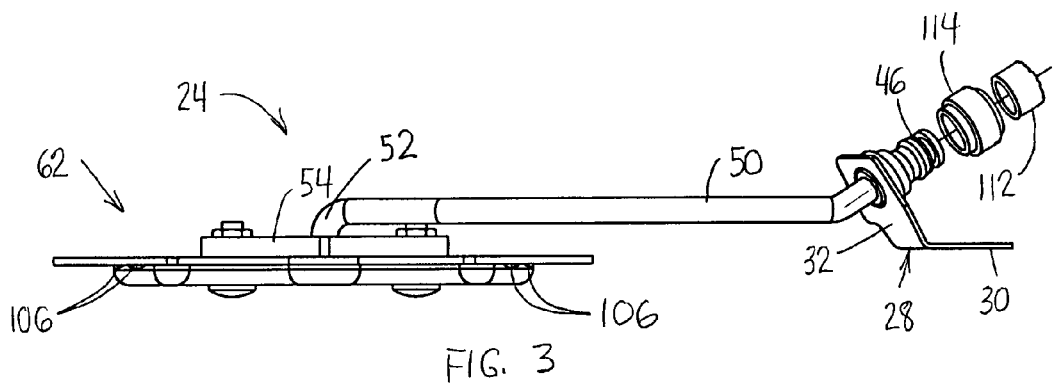
FIG. 3 is a front view of the washing device according to the instant invention.

Looking first to FIGS. 1 and 2, there is illustrated a mower cutting deck 10 disposed with ground engaging wheels 12 and having two cutting chambers 14. The chambers 14 are comprised of top surfaces 16 and depending surrounding skirts 18. Enclosed within each chamber 14 and thus, surrounded by a skirt 18, is a cutting blade 20 connected to a spindle 22. Attached to the deck 10 is a washing device 24 intended to deliver water to remove debris from an underside surface 26 of each of the chambers 14. The device 24, as shown in the enlarged views of FIGS. 3–5, includes a bracket 28 having a straightened portion 30 and an angled portion 32. Each of the portions 30, 32 have respective holes 34, 36 therethrough. Attachment of the device 24 to a flange 38 of the deck 10 is made by inserting a bolt 40 through the straightened portion 30 and thereafter, into a corresponding hole 42 provided in the flange 38. In order to secure the device 24 to the flange 38, a nut 44 is mounted to the bolt 40 on a side of the flange 38 opposite that from which it had entered. As seen in FIG. 3, passed through and attached to the angled portion 32 of the bracket 28 is a quick attach fitting 46 and having an opening 48 therein. Connected to the fitting 46 at opening 48 is a tube 50 which provides an elongated portion for delivery of a cleaning agent, such as water, to the chambers 14. Rigidly secured to an opposite end 52 of the tube 50 is a mounting plate 54 having at least three holes 56, 58, 60 therethrough, as illustrated in FIG. 5. Each of the three holes 56, 58, 60 is located in the middle of the plate 54 and along a longitudinal axis thereof. The middle hole 58 is a flow hole to which the tube 50 is directly connected so as to allow the flow of water therethrough. Each of the connections, that is, the fitting 46 to the bracket 28, the tube 50 to fitting 46 and bracket 28, and the tube 50 to the mounting plate 54 are preferably made by welding so as to form a one-piece construction among the respective parts. Further, bracket 28, fitting 46, tube 50, and mounting plate 54 are, preferably, made of metal.

Figure 4:
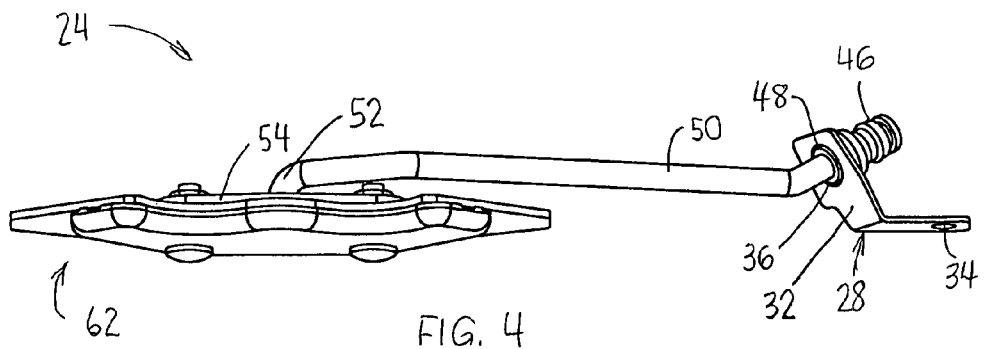
FIG. 4 is a front elevated view of the washing device according to the instant invention.
Figure 5:
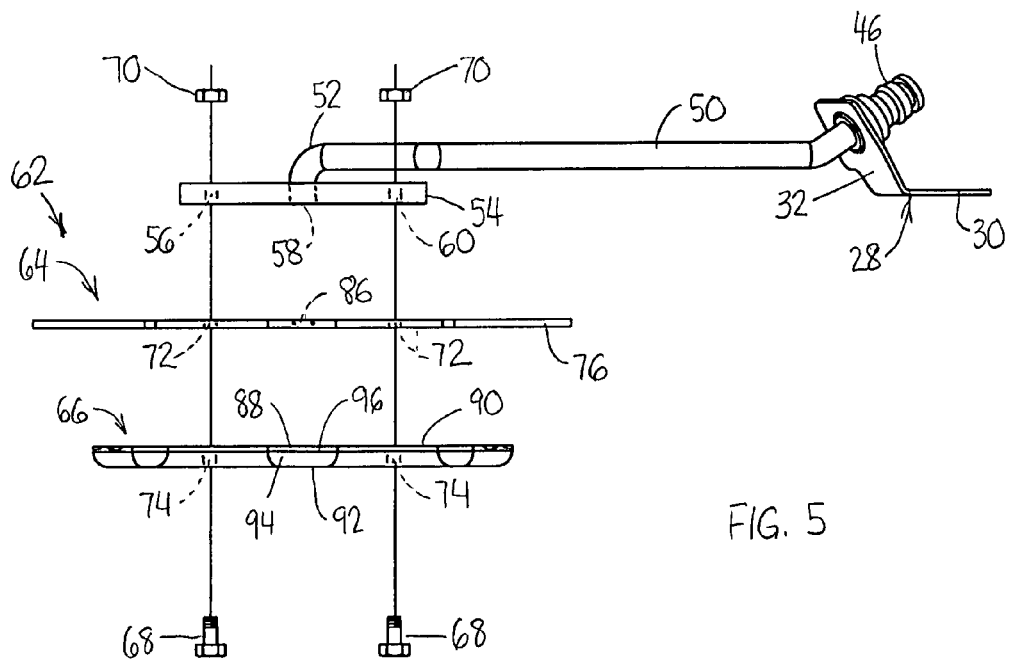
FIG. 5. is an exploded view corresponding to the illustration of FIG. 3.

As shown in FIGS. 3–5, coupled to mounting plate 54 is an elongated assembly 62 having arcuately shaped portions, the assembly being provided for dispersing water throughout the chamber 14 and onto its underside surface(s) 26. The assembly 62 consists of first and second liquid dispersion plates 64, 66, respectively, mounted to each other by a bolt 68 and nut 70 associated with holes 72, 74, respectively. Holes 72, 74 correspond to and align with holes 56, 60 of mounting plate 54 to permit a smooth and uninterrupted flow of water through middle hole 58. As shown in FIG. 2, first plate 64 is flat and is constructed with oversized portions 76 relative to the surface area required for its mounting with second plate 66, the first plate 64 being connected directly adjacent mounting plate 54. Within oversized portions 76, mounting holes 78, 80 are included in each of plates 64, 66, respectively, to permit securement with an underside 81 of the flange 38. Mounting of each of the plates 64, 66 to the flange 38 is accomplished through use of a bolt 82 and nut 84. It is preferred that plate 64 be constructed of metal so as to allow a smooth interface with deck 10 upon mounting. Additionally, in an effort to reduce both costs of construction and the inconvenience of corrosion, it is contemplated that plate 66 will be made of plastic.

To allow the flow of water into the assembly 62, first plate 64 is formed with a bore 86, as seen in FIG. 5. Looking again to FIG. 5 and also to FIGS. 7 and 7a, second plate 66 includes a hollowed out configuration in its top surface 90. This configuration includes an opening 88 into which liquid is received from the tube 50. Opening 88 is bounded by a bottom surface 92 and walls 94 which designate a cavity 96 that, in turn, receives water from the tube 50. Walls 94 elevate gradually and smoothly from bottom surface 92 to provide cavity 96. From the cavity 96, water is quickly transported to two pathways 98 which, together with cavity 96, form a semi-ovular channel 100 for directing water within second plate 66. The cavity 96 includes sides 102, 104 which are connected to diverging pathways 98 or liquid directing surfaces, as shown in FIGS. 7 and 7a. As seen in FIG. 7a, on the first side 102, the cavity 96 is structured in an inverted V-shape configuration so as to deflect water onto the pathways 98 after entry into cavity 96. Further assisting in directing the water to the pathways 98 is the side 104 of the cavity 96 in the shape of an inverted parabola or substantially inverted U. Pathways 98 are arcuately shaped so as to reduce construction costs of second plate 66 and also to conform to the overall arcuate design of first plate 64.

Shown in FIGS. 3, 6 and 6a, first plate 64 is coupled to second plate 66 in order to cause the dispersion of water into chambers 14. Specifically, the dispersion is achieved by the mating of the first plate 64 to top surface 90 wherein channel 100 is defined and contained in second plate 66 so as to create a pair of orifices 106 at each of its end portions 108 permitting water to be discharged into the cutting chambers 14. End portions 108 are elevated in height relative to a bottom surface 110 of the pathways 98 so as to provide a constriction of the orifices 106 through which water is emitted. A resulting decreased area between the first plate 64 and end portions 108 permits an emission of water at a higher velocity than would occur if an area were calculated from bottom surface 110, assuming equal pressurization.

Figure 9:
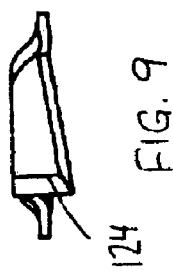
FIG. 9 is a side view of an end of the cutting blade as shown in FIG. 8.
Figure 8:
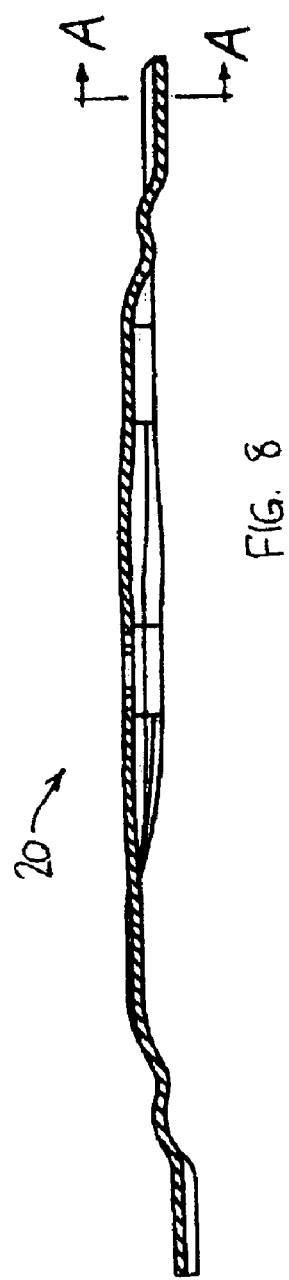
FIG. 8 is a front sectional view of a cutting blade usable with the present invention.
Figure 10:
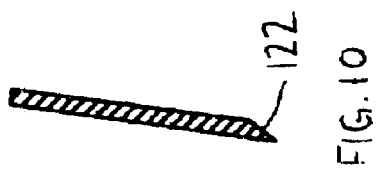
FIG. 10 is a cross section taken along the line A—A of FIG. 8.

Washing of the underside surfaces 26 of the chambers 14 is accomplished, preferably, in the following manner. First, as seen in FIG. 3, a user will connect a garden hose 112 to the device 24 by inserting the hose 112 into an ordinary quick connector 114 which is to be coupled with fitting 46, preferably a quick attachment. Water from the hose 112 will then flow into the tube 50 and assembly 62 in order to disperse the water into the cutting chambers 14. As seen in FIG. 2, upon entry into the chambers 14, the water is sprayed from the assembly 62 in four separate fanned streams 116 of flow. The fans 116 are separated by a divider 118, shown in FIGS. 6 and 7. At end portions 108 of the pathways 98, the dividers 118 are positioned between increases in elevation 120 relative to bottom surface 110. The increases 120 occur smoothly along a gradually elevating slope in order to permit the water to flow easily toward orifices 106 while rising in elevation. Due to increase(s) 120 at the channel's end portions 108, the fans 116 are projected significantly above the blade 20 even though the vents 106 within assembly 62 are mounted on a plane which is only slightly above the blade 20 at a front portion of the deck 10. Further assisting in dispersing the water throughout the chamber 14 are the width and arcuate design of the channel 100. When utilizing an ordinary household flow rate of 5–10 gallons per minute (gpm), the fans 116 are easily permitted to flow above the blade 20 and, because of the divider 118 flow on opposite sides of spindles 22, seen in FIG. 2, to contact the side 126 of the chamber 14 opposite that at which they had entered. Each of the orifices 106 through which the fans 116 flow is, preferably, calculated to have an area of approximately 0.0217 square inches on either side of the divider 118. Upon contact with an opposite side 126 of the chamber 14, the water is deflected into the blade 20 and lifted by the blade edge 122 and swept over the blade wing 124, shown in FIGS. 8–10. As this occurs, the water is then distributed to the underside surfaces 26 of the chamber 14 above the blade 20 to accomplish an overall cleaning of the chambers 14. To increase the distribution and circulation of water within the chamber 14, blades with greater lifting characteristics can be used.

Figure 11:
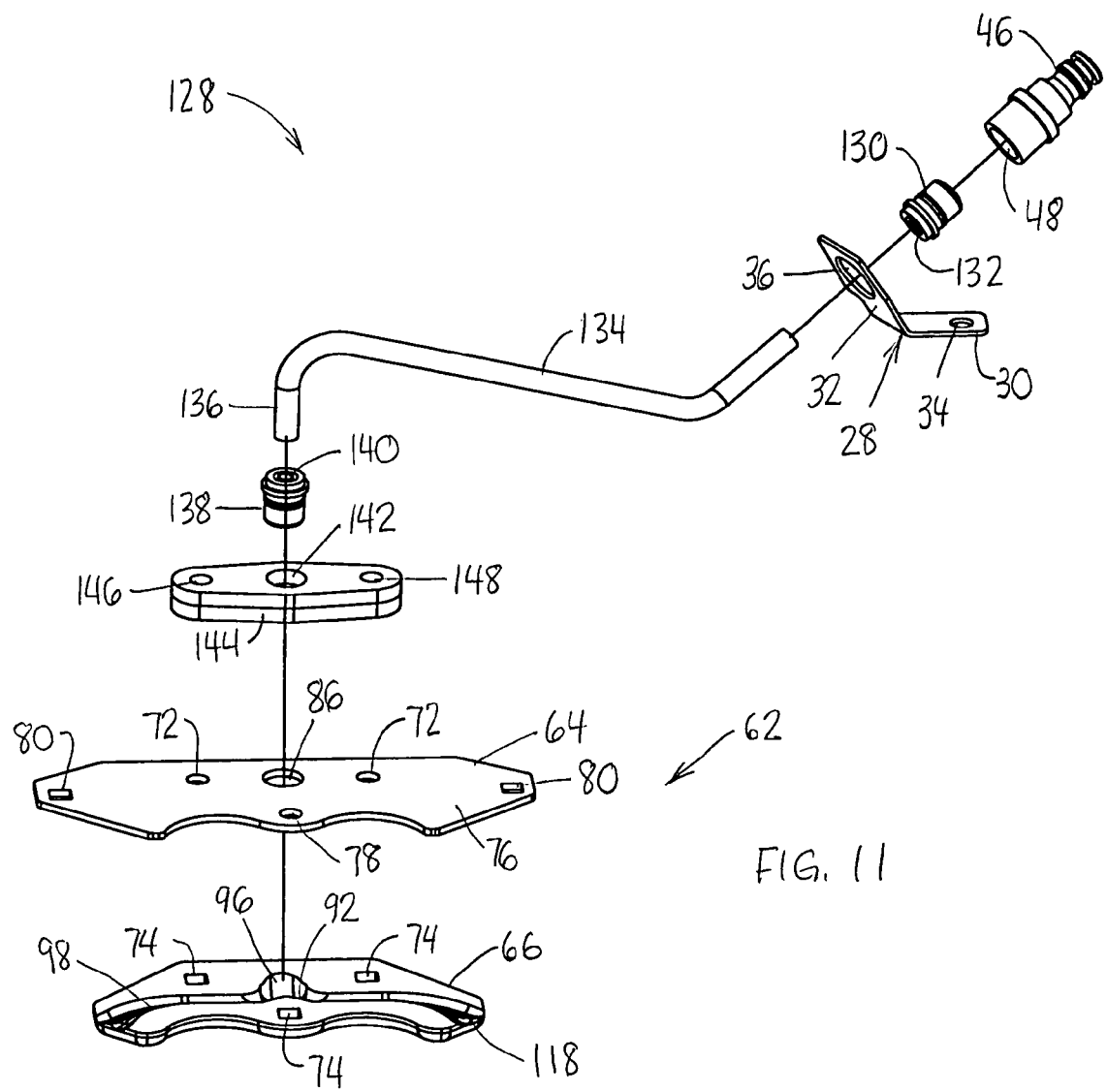
FIG. 11 is an exploded view of a second embodiment according to the instant invention.

As seen in FIG. 11, another form of the invention accomplishes all of the advantages previously described while permitting greater adaptational capability of the device. Looking to FIG. 11, there is provided a washing device 128 which uses flexible tube 134 that permits the tube of the device to be mounted adjacent to and around obstacles carried on the deck 10. With like reference numbers representing parts identical to those depicted in FIGS. 1–10, only differing components will be designated with different numbers. Inserted into opening 48 of fitting 46 is a first coupler 130, the engagement of the fitting 46 and the coupler 130 securing both to bracket 28. Placed within an opening 132 of coupler 130 is an elongated member comprising a flexible, preferably plastic, tube 134 allowing the overall end-to-end dimension of the device 128 to be changed. As seen in FIG. 11, at an opposite end 136 of the tube 134, a second coupler 138 is attached, the second coupler 138 positioned within a middle hole 142 of an adapter plate 144 used to enable connection of the tube 134, and therefore delivery of water, to the assembly 62. Like second plate 66, adapter plate 144, preferably made of plastic, is configured with three holes 142, 146 148, the middle 142 of which is a flow hole having two mounting holes 146, 148 on opposite sides. Similar to the connection of second plate 66, adapter plate 144 is connected to assembly 62 with the use of bolts and nuts. Through use of the above tube 134 and couplers 130, 138, disassembly of the device is easily accomplished so as to permit periodic cleaning of the device 128.

With the instant invention, there is provided an easily assembled washing device permitting a user to clean the underside surfaces of one or more cutting chambers of a mower deck. A still further advantage is found in a form of the device which can be quickly adapted to a mower on an after-market basis. From among these advantages, the user is enabled to reduce the amount of time and effort necessary to obtain the completion of either personal and/or professional grounds-care maintenance.

While the present invention has been described in conjunction with a specific embodiment, it is understood that many alternatives, modifications, and variations will be apparent to those skilled in the art in light of the foregoing description. Accordingly, this invention is intended to embrace all such alternatives, modifications and variations which fall within the spirit and scope of the appended claims.

We claim:

1. A washing device for an underside of a mower cutting deck, the device comprising:
    a bracket for attaching the device to the deck, the bracket having a plurality of holes therein;
    a means for attaching the bracket with the deck and which extends through one of the holes of the bracket;
    a hose fitting inserted in another of the holes of the bracket; and,
    a means for transferring liquid, the means having a flexible elongated portion having first end attached to and communicating with the fitting to conduct liquid therethrough and a second end including a mounting plate adjustably connected with the elongated portion, the mounting plate having plurality of holes, one of which is a liquid flow hole accommodating liquid therethrough;
    wherein the means for transferring liquid is mated to the fitting by a first coupler;
    wherein the elongated portion is mated to the mounting plate by a second coupler;
    further comprising a pair of liquid dispersion plates, the pair having connection holes therein enabling attachment of each of the pair to the other and the mounting plate, the pair also having mounting holes enabling attachment to the underside;
    wherein the connection holes and the holes of the mounting plate are aligned;
    wherein the dispersion plates and the mounting plate are attached to each other by a bolt and a nut;
    wherein each of the dispersion plates has a central opening communicating together with the flow hole of the mounting plate to conduct liquid therethrough; and
    wherein one of the dispersion plates is formed of metal and the other of the dispersion plates is formed of plastic.

2. A washing device for an underside of a mower cutting deck, the device comprising:
    a bracket for attaching the device to the deck, the bracket having a plurality of holes therein;
    a means for attaching the bracket with the deck and which extends through one of the holes of the bracket;
    a hose fitting inserted in another of the holes of the bracket; and,
    a means for transferring liquid, the means having a flexible elongated portion having first end attached to and communicating with the fitting to conduct liquid therethrough and a second end including a mounting plate adjustably connected with the elongated portion, the mounting plate having plurality of holes, one of which is a liquid flow hole accommodating liquid therethrough;

further comprising a liquid dispersion assembly attached to the mounting plate;

wherein the assembly includes first and second directional members attached to each other and which are attachable to the underside of the cutting deck, each of the members having a central opening communicating with the flow hole of the mounting plate to conduct liquid therethrough;

wherein the first directional member is positioned intermediate the mounting plate and second directional member; and wherein the second directional member has a channel extending along a longitudinal axis thereof.

3. The device as recited in claim 2 wherein a cavity is formed at a midpoint of the channel.

4. The device as recited in claim 3 wherein the bottom surface of the cavity is substantially even with the bottom surface of the second directional member.

5. The device as recited in claim 4 wherein at least three sides of the channel extend upwardly from the bottom surface in a smooth progression.

6. The device as recited in claim 5 wherein a first side of the cavity has a V-shape configuration inverted relative to a longitudinal centerline of the second directional member and a second side of the cavity has a semi-ovular configuration.

7. The device as recited in claim 6 wherein third and fourth sides of the cavity route liquid to end portions of the channel.

8. The device as recited in claim 7 wherein the end portions maintain an increasing rate of slope.

9. The devise as recited in claim 8 wherein the end portions are separated by a divider integral with the channel so as to cause a split of liquid contacting the end portions.

10. The device as recited in claim 9 wherein the attachment of the first and second directional members provide an orifice at the end portions through which liquid may be emitted.

11. A washing device for an underside of a mower cutting deck, the device comprising:
  a bracket for attaching the device to the deck, the bracket having a plurality of holes therein;
  a means for attaching the bracket with the deck and which extends through one of the holes of the bracket;
  a hose fitting inserted in another of the holes of the bracket;
  a means for transferring liquid, the means having an elongated portion having first end attached to and communicating with the fitting to conduct liquid therethrough and a second end including a mounting plate, the mounting plate having a plurality of holes, one of which is a liquid flow hole accommodating liquid therethrough;
  a liquid dispersion assembly attached to the mounting plate;
  wherein the assembly includes first and second directional members attached to each other and which are attachable to the underside of the cutting deck each of the members having a central opening communicating with the flow hole of the mounting plate to conduct liquid therethrough;
  wherein the first directional member is positioned intermediate the mounting plate and second directional member; and
  wherein the second directional member has a channel extending along a longitudinal axis thereof.

12. The device as recited in claim 11 wherein a cavity is formed at a midpoint of the channel.

13. The device as recited in claim 12 wherein the bottom surface of the cavity is substantially even with the bottom surface of the second directional member.

14. The device as recited in claim 13 wherein at lest three sides of the channel extend upwardly from the bottom surface in a smooth progression.

15. The device as recited in claim 14 wherein a first side of the cavity has a V-shape configuration inverted relative to a longitudinal centerline of the second directional member and a second side of the cavity has a semi-ovular configuration.

16. The device as recited in claim 15 wherein third and fourth sides of the cavity route liquid to end portions of the channel.

17. The device as recited in claim 16 wherein the end portions maintain an increasing rate of slop.

18. The device as recited in claim 17 wherein the end portions are separated by a divider integral with the channel so as to cause a split of liquid contacting the end portions.

19. The device as recited in claim 18 wherein the attachment of the first and second directional members provide an orifice at the end portions through which liquid may be emitted.

20. A washing device for an underside of a mower cutting deck, the device comprising:
  a bracket for attaching the device to the deck, the bracket having a plurality of holes therein;
  a means for attaching the bracket with the deck and which extends through one of the holes of the bracket;
  a hose fitting inserted in another of the holes of the bracket;
  a means for transferring liquid, the means having an elongated portion having first end attached to and communicating with the fitting to conduct liquid therethrough and a second end including a mounting plate, the mounting plate having a plurality of holes, one of which is a liquid flow hole accommodating liquid therethrough;
  a liquid dispersion assembly attached to the mounting plate;
  wherein the assembly includes first and second directional members attached to each other and which are attachable to the underside of the cutting deck, each of the members having a central opening communicating with the flow hole of the mounting plate to conduct liquid therethrough;
  wherein the attachment of the first and second directional members provide an orifice through which liquid may be emitted; and
  wherein the first directional member is formed of metal, the second directional member is formed of plastic and the liquid is water.

21. A mower cutting deck, comprising:
  a) at least one cutting chamber having an aperture positioned in the middle of a top surface thereof and a depending surrounding skirt;
  b) a spindle placed through the aperture and mounted to the chamber;

c) a blade mounted on an end of the spindle and within the chamber; and, d) a liquid dispersion assembly mounted to an underside of the chamber and including first and second plates engaged with each other the second plate having a channel to control the flow of liquid therethrough so as to project such flow above the blade, the channel having a midpoint at which a cavity, having a bottom surface, is formed where liquid enters the channel after having passed through the first plate.

22. The device as recited in claim 21 wherein the bottom surface of the cavity is substantially even with a bottom surface of the second directional member.

23. The device as recited in claim 22 wherein at least three sides of the channel extend upwardly from the bottom surface in a smooth progression.

24. The device as recited in claim 23 wherein a first side of the cavity has a V-shape configuration inverted relative to a longitudinal centerline of a second plate and a second side of the cavity has a semi-ovular configuration.

25. The device as recited in claim 24 wherein third and fourth sides of the cavity route liquid to end portions of the channel.

26. The device as recited in claim 25 wherein the end portions maintain an increasing rate of slope.

27. The device as recited in claim 26 wherein the end portions are separated by a divider integral with the channel so as to separate the flow of liquid contacting the end portions.

28. The device as recited in claim 27 wherein the engagement of the first and second plates provides an orifice through which liquid may be emitted.

29. The device as recited in claim 28 wherein the liquid exits the orifice in two individual fans of liquid.

30. The device as recited in claim 29 wherein the fans contact a portion of the chamber opposite that at which they enter.

* * * * *